United States Patent
Adhikari et al.

(10) Patent No.: US 11,861,031 B2
(45) Date of Patent: Jan. 2, 2024

(54) DISTRIBUTED LEDGER INTERFACE SYSTEM FOR BACKGROUND VERIFICATION OF AN INDIVIDUAL

(71) Applicant: Allstate Solutions Private Limited, Bangalore (IN)

(72) Inventors: Anupam Adhikari, Bangalore (IN); Rohit Basuri, Bangalore (IN)

(73) Assignee: Allstate Solutions Private Limited, Bangalore (IN)

( * ) Notice: Subject to any disclaimer, the term of this patent is extended or adjusted under 35 U.S.C. 154(b) by 170 days.

(21) Appl. No.: 16/901,249

(22) Filed: Jun. 15, 2020

(65) Prior Publication Data

US 2021/0390201 A1 Dec. 16, 2021

(51) Int. Cl.
*G06F 21/62* (2013.01)
*H04L 9/06* (2006.01)
(Continued)

(52) U.S. Cl.
CPC ...... *G06F 21/6227* (2013.01); *G06F 21/6272* (2013.01); *H04L 9/0637* (2013.01);
(Continued)

(58) Field of Classification Search
CPC ............. G06F 21/6227; G06F 21/6272; H04L 9/0637; H04L 9/0833; H04L 9/3239; H04L 2209/38
See application file for complete search history.

(56) References Cited

U.S. PATENT DOCUMENTS

2012/0054680 A1* 3/2012 Moonka ............ G06Q 30/0269
715/810
2016/0203522 A1* 7/2016 Shiffert ............ G06Q 30/0267
705/14.58
(Continued)

FOREIGN PATENT DOCUMENTS

CN 107483498 A 12/2017
CN 107943996 A 4/2018
(Continued)

OTHER PUBLICATIONS

"CVerification: Blockchain-based Recruitment and Background Verification Platform" CVerification Ltd. Whitepaper version 1.07, Sep. 15, 2018, pp. 1-36.
(Continued)

*Primary Examiner* — Lynn D Feild
*Assistant Examiner* — Vladimir I Gavrilenko
(74) *Attorney, Agent, or Firm* — Dinsmore & Shohl LLP

(57) ABSTRACT

Systems and methods are disclosed for using a distributed ledger interface system to facilitate background verification of an individual. One method may include, sending, by a server to a first device associated with a first organization, an indication that an individual is ending the membership to the first organization; unlocking access to an individual-specific data structure in a distributed ledger, wherein the individual-specific data structure allows storage of a plurality of data values corresponding to a plurality of background aspects of the individual, and wherein the distributed ledger is shared within a plurality of nodes within a network; providing, to a user device associated with the individual, a digital key to allow permission to access the individual-specific data structure; and granting, to a second computing device associated with a second organization, and based on a permission
(Continued)

received from the user device, access to the individual-specific data structure.

18 Claims, 5 Drawing Sheets

(51) Int. Cl.
  *H04L 9/08* (2006.01)
  *H04L 9/32* (2006.01)
  *H04L 9/00* (2022.01)
(52) U.S. Cl.
  CPC .......... *H04L 9/0833* (2013.01); *H04L 9/3239* (2013.01); *H04L 9/50* (2022.05)

(56) References Cited

U.S. PATENT DOCUMENTS

| | | | |
|---|---|---|---|
| 2016/0239657 | A1 | 8/2016 | Loughlin-McHugh et al. |
| 2017/0111175 | A1 | 4/2017 | Oberhauser et al. |
| 2018/0082256 | A1 | 3/2018 | Tummuru et al. |
| 2018/0115426 | A1 | 4/2018 | Andrade |
| 2018/0285879 | A1 | 10/2018 | Gadnis et al. |
| 2018/0288033 | A1 | 10/2018 | Kamal |
| 2018/0293547 | A1 | 10/2018 | Randhawa |
| 2018/0307859 | A1 | 10/2018 | Lafever et al. |
| 2018/0336286 | A1 | 11/2018 | Shah |
| 2019/0156291 | A1 | 5/2019 | Nayak et al. |
| 2019/0188806 | A1 | 6/2019 | Torrenegra et al. |
| 2019/0251573 | A1 | 8/2019 | Toyota et al. |
| 2019/0253431 | A1 | 8/2019 | Atanda |
| 2019/0279160 | A1 | 9/2019 | Whitney et al. |
| 2019/0327082 | A1 | 10/2019 | Ow et al. |
| 2019/0347433 | A1 | 11/2019 | Chakravorty et al. |
| 2019/0349371 | A1 | 11/2019 | Smith et al. |
| 2019/0378092 | A1* | 12/2019 | Alexander ......... G06Q 10/1053 |
| 2020/0162448 | A1* | 5/2020 | Dasika Venkata Devi .................. H04L 67/306 |
| 2020/0380509 | A1* | 12/2020 | Billman ................. G06Q 20/32 |
| 2021/0119768 | A1* | 4/2021 | Han ...................... H04L 9/3239 |

FOREIGN PATENT DOCUMENTS

| | | |
|---|---|---|
| CN | 108830983 A | 11/2018 |
| CN | 109064124 A | 12/2018 |
| WO | 2017153495 A1 | 9/2017 |
| WO | 2019/060567 A1 | 3/2019 |
| WO | 2019152431 A1 | 8/2019 |
| WO | 2019/191215 A1 | 10/2019 |

OTHER PUBLICATIONS

"Blockchain" A New Dawn of Employment Verification cFIRST Think Tank https://www.cfirstcorp.com/blockchain-employment-verification/ Dec. 18, 2018, pp. 1-7.
"How HR Departments Could Use Blockchain Technology for Background Checks" Datacheck https://datacheckinc.com/blog/how-hr-departments-could-use-blockchain-technology-for-background-checks/ website visited Jun. 9, 2020, pp. 1-3.
"Credential Verification For the World" Aversafe https://www.aversafe.com/ website visited Jun. 9, 2020, pp. 1-2.
"User Owned and Managed Digital Identity" Verif-y https://verif-y.com/ website visited Jun. 9, 2020, pp. 1-8.
"Use Blockchain Technology to Expedite Recruiting" Eleserv https://www.eleserv.com/blockchain-technology-in-recruiting/ website visited Jun. 9, 2020, pp. 1-4.
"We verify your credentials so potential employers don't have to. Here's how . . . " appii https://appii.io/features/ website visited Jun. 9, 2020, pp. 1-6.
"Blockchain for HR and Recruitment Is More Than Just Hype" Cielo https://www.cielotalent.com/insights/blockchain-for-hr-and-recruitment-benefits/ website visited Jun. 9, 2020, pp. 1-4.
Vivek Khanna "Blockchain—A catalyst for background screening" Computerworld https://www.computerworld.com/article/3411985/blockchain-a-catalyst-for-background-screening.html Aug. 5, 2019, pp. 1-5.
Meng Han et al. "A Novel Blockchain—based Education Records Verification Solution" ACM Digital Library https://dl.acm.org/doi/10.1145/3241815.3241870 Sep. 2018, pp. 1-5.
International Search Report and Written Opinion for Appln. No. PCT/IN21/50584 dated Sep. 23, 2021, 21 pages.

* cited by examiner

DISTRIBUTED LEDGER INTERFACE SYSTEM FOR BACKGROUND VERIFICATION OF AN INDIVIDUAL

TECHNICAL FIELD

Aspects of the disclosure generally relate to distributed ledger networks. In particular, various aspects of the disclosure include a distributed ledger interface system for background verification of an individual.

BACKGROUND

In most industries, organizations often spend a significant amount of money, time and effort in carrying out the background verification of the employees they hire. Furthermore, employees of organizations may be burdened with maintaining documentation (e.g., resume, transcripts, etc.) concerning the employees' credentials throughout their employment to be able to present to each subsequent new employer. The documentation may be based on credentials earned at, or remarks given by, a plurality of distinct organizations (e.g., previous employers, educational institutions, training centers, certificate programs, municipal bodies, credit rating agencies, etc.). Methods of verifying such documentation may be unreliable, nontransparent, and tedious. These and other shortcomings are identified and addressed by the disclosure.

The present disclosure may address one or more of the shortcomings described above.

BRIEF SUMMARY

In light of the foregoing background, the following presents a simplified summary of the present disclosure in order to provide a basic understanding of some aspects of the features described herein. This summary is not an extensive overview of all of the features described herein. The following summary merely presents some concepts in a simplified form as a prelude to the more detailed description provided below.

There is a desire for a reliable, transparent, and automated system and method for verifying this documentation as it relates to employment or verification of other credentials at the appropriate organizations. Furthermore, there is desire for a reliable, transparent, and automated system and method for performing a background verification of an individual, e.g., before hire. Systems and methods are described for using a decentralized database platform designed as an immutable ledger shared among a plurality of nodes (e.g., a "distributed ledger") to facilitate background verification of an employee or other member of an organization. Any entry of information into the distributed ledger may require an approval by other nodes that share the distributed ledger so as to prevent fraud or entry of inconsistent information. The information entered into the distributed ledger may be related to credentials, remarks, and/or other data useful for assessing the candidacy of an individual (e.g., an employee, a student, an intern, and extern, a fellow, a trainee, etc.) for an organization (e.g., an employer, an educational or academic institution, etc.). The information may be categorized for example, into education credentials (e.g., transcripts, grades, academic ranking, etc.), work experience credentials (e.g., previous employers, work history, job descriptions, projects, achievements, performance evaluations, reasons for ending employment, etc.), legal records (e.g., criminal records, civil legal records, citizenship, work permits, etc.), online contributions, etc. In various aspects of the present disclosure, these categories of credentials, remarks, and contributions may be referred to as background aspects, and the data entered to describe the background aspects may be referred to as data values. Furthermore, the distributed ledger may include a data structure for entering data values for background aspects of an individual, and such a data structure may be referred to as, for example, an "individual-specific data structure," for simplicity. The individual-specific data structure may comprise blocks of immutable data verified by various nodes of the distributed ledger, and shared among the various nodes. The nodes may comprise participants in the data entry, data verification, data mining, and/or data accessing functions of the distributed ledger, and the participants may include, for example, the computing systems and devices associated with the organizations or the individuals. A computing system, device, or server ("server", "distributed ledger interface system" or "distributed ledger interface server") may facilitate the data entry, data verification, data mining, and/or other use of the distributed ledger by the various participants. The use of the distributed ledger and the security and accessibility mechanisms explained herein may ease the burden of organizations as they perform background verifications for individual candidates, in accordance with systems and methods presented herein.

One example method comprises: sending, via a communication network, by a distributed ledger interface system having at least one processor and to a first computing device associated with a first organization, an indication that an individual that has membership to the first organization is ending the membership to the first organization; unlocking, based on a command received from the first computing device, access to an individual-specific data structure in a distributed ledger, wherein the individual-specific data structure allows storage of a plurality of data values corresponding to a plurality of background aspects of the individual; wherein the individual-specific data structure stores a first data value of the plurality of data values corresponding to a first background aspect of the plurality of background aspects of the individual, and wherein the distributed ledger is shared within a plurality of nodes within a network; providing, to a user device associated with the individual and based on the unlocked access, a digital key associated with the individual-specific data structure to allow permission to access the individual-specific data structure; and granting, to a second computing device associated with a second organization, and based on a permission received from the user device, access to the individual-specific data structure.

In accordance with other embodiments of the present disclosure, the method may further include prior to the sending the indication, creating, by the distributed ledger interface system via the communication network, the individual-specific data structure in the distributed ledger, wherein the individual-specific data structure comprises one or more blocks; receiving, from a computing device associated with a node of the network, a request to enter the first data value corresponding to the first background aspect of the individual; hashing, based on a cryptographic algorithm associated with the distributed ledger, the first data value; receiving a verification from each of the nodes of the network for the first data value; and recording, in a first block of the one or more blocks of the individual-specific data structure in the distributed ledger, the first data value corresponding to the first background aspect of the individual.

In accordance with other embodiments of the present disclosure, an example system comprises one or more processors; and a memory storing computer-executable instructions. When the computer-executable instructions are executed by the one or more processors, the processors may cause the system to unlock access to an individual-specific data structure in a distributed ledger. The individual-specific data structure may allow storage of a plurality of data values corresponding to a plurality of background aspects of the individual. The individual-specific data structure may store a first data value of the plurality of data values corresponding to a first background aspect of the plurality of background aspects of the individual. Furthermore, the distributed ledger may be shared within a plurality of nodes within a network. The plurality of nodes may include at least a first computing device associated with a first organization. When the computer-executable instructions are executed by the one or more processors, the processors may further cause the system to: provide, to a user device associated with the individual and based on the unlocked access, a digital key associated with the individual-specific data structure to allow the individual to control access to the individual-specific data structure; grant, to a second computing device associated with a second organization, and based on permission received from the user device, access to the individual-specific data structure; and send, via a communication network, to a first computing device associated with the first organization, an indication that the individual is ending membership to the first organization.

In accordance with other embodiments of the present disclosure, one or more non-transitory computer readable media stores computer-executable instructions. When these computer-executable instructions are executed by a computing device, the computing device may perform one or more of the methods described herein.

Other features and advantages of the disclosure will be apparent from the additional description provided herein.

The methods and systems of the above-referenced embodiments may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages will be apparent from the description, drawings, and claims.

BRIEF DESCRIPTION OF THE DRAWINGS

A more complete understanding of the present invention and the advantages thereof may be acquired by referring to the following description in consideration of the accompanying drawing, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

As discussed, performing background verification for an incoming individual that seeks membership to an organization (e.g., an applicant for a job position, a candidate for hiring, etc.) can be a time-intensive and costly process. Furthermore, individuals may be burdened with maintaining documentation concerning the individuals' credentials and other relevant data throughout their academic, vocational, and/or employment history to be able to present such documents to each new organization. A distributed ledger interface server, which interacts with a distributed ledger that maintains and tracks such data throughout the individual's academic, vocational, and/or employment history can help to ease the burden faced by organizations and their individual members (e.g., employees, students, trainees, interns, externs, etc.).

Figure 1:
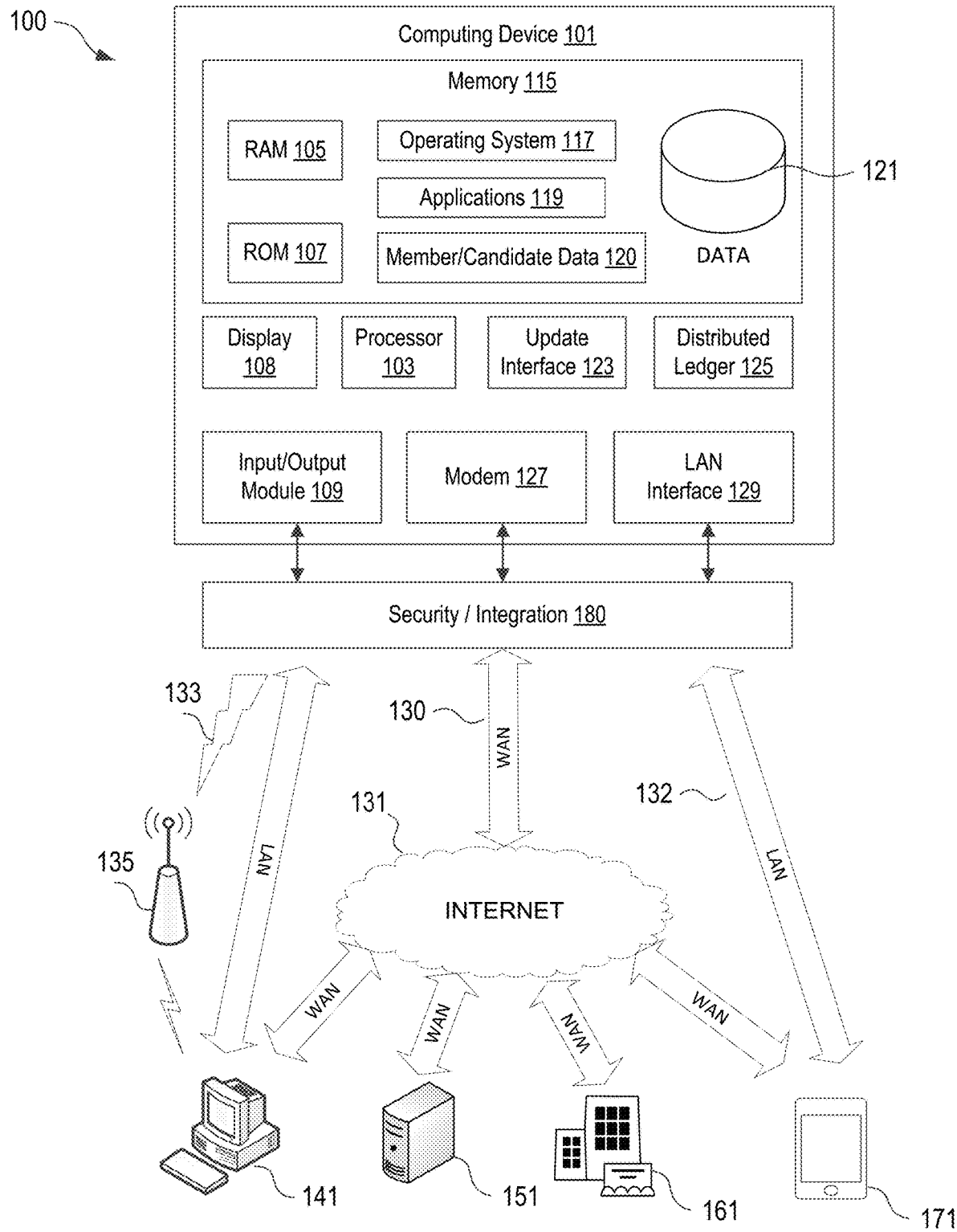
FIG. 1 is a diagram of an example computing device and operating environment in which one or more aspects described herein may be implemented.

FIG. 1 is a block diagram of an example computing device 101 in an operating environment 100 in which one or more aspects described herein may be implemented. The computing device 101 or one or more components of computing device 101 may be utilized by any device, computing system, or server interacting with a distributed ledger, or with a distributed ledger interface system, to perform the functions described herein. For example, the computing device 101 may be utilized by an operator of one or more servers that facilitate the use of a distributed ledger to perform a background verification of an individual, e.g., upon or prior to hiring for employment. The one or more servers, which may be referred to as "distributed ledger interface system," "distributed ledger interface server," "interface system," or "interface server" for simplicity, may be an interface for various computing systems and devices associated with organizations or individuals to interact with a distributed ledger (e.g., a blockchain) for one or more functions described herein. The one or more functions may include, for example, the entering of information as it pertains to an individual that may be a member of an organization (e.g., an employee) or a candidate for a position at an organization, the verification of the information, the encryption or decryption of the information, results of a secondary verification of the information (e.g., based on external sources), etc.

The computing device 101 may have a processor 103 for controlling overall operation of the device 101 and its associated components, including RAM 105, ROM 107, input/output module 109, and memory 115. As explained above, the computing device 101, along with one or more additional devices (e.g., terminals 141, 151, 161, and 171, and security and integration hardware 180) may correspond to any of multiple systems or devices described herein, such as personal mobile or desktop devices associated with an individual (e.g., "user devices"); servers, computing systems, and devices associated with an organization ("organization computing device" or "organization computing system"); servers, computing systems, and devices associated with various institutions that are sources of individual-specific data that are pertinent to background verification for an individual (e.g., "data value source systems"); the distributed ledger interface system; internal data sources; external data sources; and other various devices used to facilitate background verification through a distributed ledger system. These various computing systems may be configured individually or in combination, as described herein, for receiving signals and/or transmissions from one or more computing devices, the signals or transmissions including data values for various aspects of an individual's background (e.g., "background aspects"), and metadata indicating the veracity or verification results for those data values.

Input/Output (I/O) 109 may include a microphone, keypad, touch screen, and/or stylus through which a user of the computing device 101 may provide input, and may also include, or be communicatively coupled to, one or more of a speaker for providing audio output and a video display device (e.g., as in display 108) for providing textual, audio-visual and/or graphical output. Also or alternatively, the display device may be separate from the input/output module 109 (e.g., as in display 108). Furthermore, display 108 may be used by a user of the computing device 101 to view information stored in the distributed ledger 125.

The distributed ledger 125 may be a replicated version, an instance, or a view of a decentralized database platform storing immutable information (e.g., data values pertaining to background aspects) in blocks cryptographically linked to one another, e.g., via blockchain technology. Furthermore, the distributed ledger 125 may comprise of various data structures pertaining to one or more individuals (e.g., individual-specific data structures) as will be described herein.

The update interface 123 may comprise one or more database management tools, applications, plug-ins, and/or code used to update databases (e.g., by creating, replacing, adding, and/or deleting data). For example, the update interface 123 may be used to enter information into the distributed ledger 125.

Software may be stored within memory 115 and/or storage to provide instructions to processor 103 for enabling device 101 to perform various actions. For example, memory 115 may store software used by the device 101, such as an operating system 117, application programs 119, and data pertaining to individual member of an organization or an individual candidate applying for a position or role in an organization (e.g., member/candidate data 120). The various hardware memory units in memory 115 may include volatile and nonvolatile, removable and non-removable media implemented in any method or technology for storage of information such as computer-readable instructions, data structures, program modules or other data. Certain devices and systems within computing systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a distributed ledger interface system, a user device, an organization computing device, a data value source system, etc.), in order to receive and analyze the signals, transmissions, etc., including receiving signals and/or transmissions from one or more computing devices. The signals or transmissions may include individual-specific data values for various aspects of an individual's background that could be used to assess the individual's candidacy for a role or position within an organization and which can be verified according to systems and methods presented herein. The signals or transmissions may further include ratings and other indicia to measure the veracity, reliability, or accuracy of specific data values for the background aspects, based on verification results. The signals or transmissions may further include queries or requests to data value source systems to verify one or more data values entered in the distributed ledger or self-reported by the individual, and may further include responses to the queries or requests. Furthermore, the signals and transmissions may include requests to participating devices at various nodes of a distributed ledger to approve data to be entered into the distributed ledger, responses to these requests, and encryption or decryption results.

Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 GHz or faster). Processor(s) 103 and its associated components may allow the computing device 101 to execute a series of computer-readable instructions, for example, receiving signals and/or transmissions described herein from one or more computing devices.

The computing device 101 may operate in a networked environment 100 supporting connections to one or more remote computers, such as terminals 141, 151, 161, and 171. Such terminals may be user devices belonging to individual members of an organization or individual candidates who seek to join an organization and may undergo background verification (e.g., user device 171). The user devices may include, for example, mobile communication devices, mobile phones, tablet computers, touch screen display devices, etc. The terminals may further include organization computing systems 141, e.g., for their respective organizations. In some aspects, organization computing systems may be used by the organizations to review or verify an individual member's or an individual candidate's self-reported profile (e.g., resume, curriculum vitae, transcripts, legal information, online profile, etc.), or information obtained from data value source systems, and/or information recorded in the distributed ledger. Furthermore, the organization computing systems 141 may be used to record additional information pertaining to the individual into the distributed ledger, e.g., via the distributed ledger interface system, or to perform verification of information already recorded in the distributed ledger. The terminals may further include data value source systems 161, such as computing systems or servers of educational institutions that issue transcripts and other academic assessments for individuals, governmental or municipal offices that hold legal information (e.g., citizenship information, civil and criminal records, etc.) pertaining to the individual, road safety offices, credit rating agencies, and the like. A data value source system 161 may act as a source for data values for various background aspects of an individual member of an organization or an individual candidate for a role or position in an organization. A terminal may include the distributed ledger interface server 151, which may facilitate the use of a distributed ledger to perform background verification for an individual.

The network connections depicted in FIG. 1 include a local area network (LAN) 132, a wide area network (WAN) 130, and a wireless telecommunications network 133, but may also include other networks. When used in a LAN networking environment, the computing device 101 may be connected to the LAN 132 through a network interface or adapter 129. When used in a WAN networking environment, the device 101 may include a modem 127 or other means for establishing communications over the WAN 130, such as network 131 (e.g., the Internet). When used in a wireless telecommunications network 133, the device 101 may include one or more transceivers, digital signal processors, and additional circuitry and software for communicating with terminals 141, 151, 161, and 171 via one or more network devices 135 (e.g., base transceiver stations) in the wireless network 133.

Also illustrated in FIG. 1 is a security and integration layer 180, through which communications are sent and managed between the device 101 and the remote devices (141, 151, 161, and 171) and remote networks (130-133). The security and integration layer 180 may comprise one or more separate computing devices, such as web servers, authentication servers, and/or various networking components (e.g., firewalls, routers, gateways, load balancers, etc.), having some or all of the elements described above with respect to the computing device 101. As an example, a security and integration layer 180 of a computing device 101 may comprise a set of web application servers configured to use secure protocols and to insulate the device 101 from external devices 141, 151, 161, and 171. In some cases, the security and integration layer 180 may correspond to a set of dedicated hardware and/or software operating at the same physical location and under the control of same entities as device 101. For example, layer 180 may correspond to one or more dedicated web servers and network hardware in distributed ledger interface system, information datacenter or in a cloud infrastructure supporting cloud-based functions for the distributed ledger. In other examples, the security and integration layer 180 may correspond to separate hardware and software components which may be operated at a separate physical location and/or by a separate entity.

As discussed below, the data transferred to and from various devices in the operating environment 100 may include secure and sensitive data obtained with permission of a user, such as confidential individual-specific data values (e.g., credentials, remarks, legal records, etc.) for various background aspects (e.g., previous employment, academic and/or training aspects, legal information (e.g., criminal and civil legal records, etc.), online profile, confidential self-reported data from individual members of an organization or candidates for a position in an organization, and confidential data verifying and/or questioning the veracity of other confidential data. Therefore, it may be desirable to protect transmissions of such data by using secure network protocols and encryption, and also to protect the integrity of the data when stored on the various devices within a system, such as the computing devices in the system 100, by using the security and integration layer 180 to authenticate users, organizations, and data value source systems and restrict access to unknown or unauthorized users. For example, the security and integration layer 180 may be used to restrict information to participant devices of nodes in which the distributed ledger is shared. In various implementations, security and integration layer 180 may provide, for example, a file-based integration scheme or a service-based integration scheme for transmitting data between the various devices in an electronic display system 100. Data may be transmitted through the security and integration layer 180, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 180. The web services may be accessed by authorized external devices and users to support input, extraction, and manipulation of the data (e.g., into distributed ledger 125) by the various devices 101 in the system 100. In still other examples, the security and integration layer 180 may include specialized hardware for providing secure web services. For example, secure network appliances in the security and integration layer 180 may include built-in features such as hardware-accelerated SSL and HTTPS, WS-Security, and firewalls. Such specialized hardware may be installed and configured in the security and integration layer 180 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 is cached in a separate smaller database on an application server separate from the database server. For instance, in a multi-tiered application, a database cache on an application server can reduce data retrieval and data manipulation time by not needing to communicate over a network with a back-end database server.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in the system components described herein may be configured to communicate using any of these network protocols or technologies.

Figure 2:
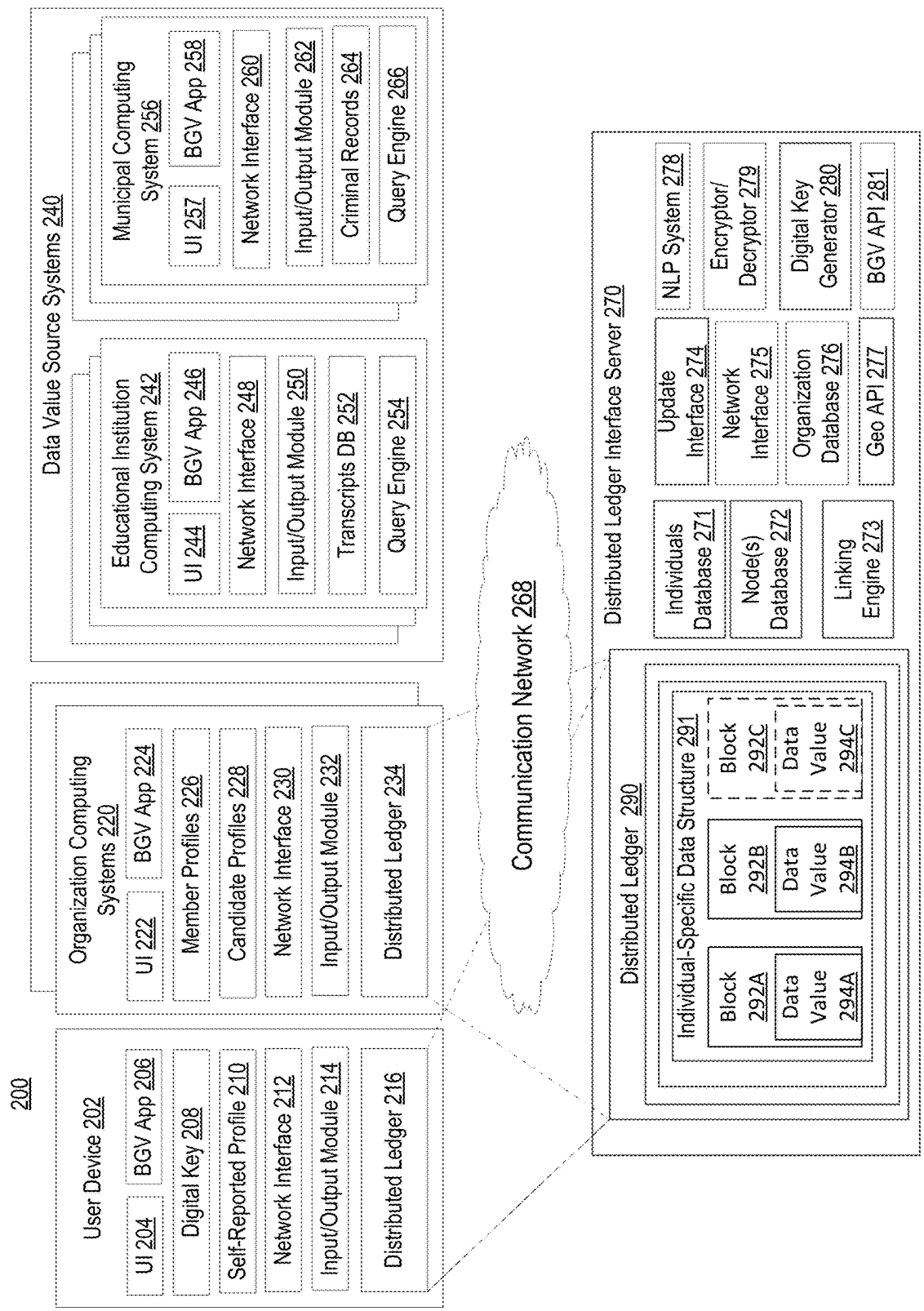
FIG. 2 illustrates a schematic diagram of an example network showing an example distributed ledger interface system and other computing systems and devices that interact with the example distributed ledger interface system.

FIG. 2 illustrates a schematic diagram showing an example network environment and computing systems (e.g., devices, servers, application program interfaces (APIs), etc.) that may be used to implement aspects of the disclosure. At a high level the network environment 200 may comprise a user device associated with an individual (e.g., user device 202); a plurality of computing systems, servers, or devices corresponding to a plurality of organizations (e.g., organization computing system(s) 220); one or more computing systems, servers or devices corresponding to institutions or sources that may function as the source for individual-specific data for background aspects of an individual (e.g., data value source system(s) 240); and a server, device, or computing system for facilitating the interaction between the various computing systems and a distributed ledger for performing various functions described herein (e.g., distributed ledger interface server 270). The above described computing systems of the network environment may be interconnected over a communications network 268.

The communication network 268 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 268 may use a series of interconnected communication links (e.g., coaxial cables, optical fibers, wireless links, etc.) to facilitate communication between the distributed ledger interface server 270, the user device 202, the organization computing system(s) 220, and the data value source system(s) 240. Each of the above-described systems may function on one or more computing systems or devices. In some aspects, one or more of the above described systems and servers may be connected; be a part of another one of the above-described systems and servers; or be components, features, or functions of a larger computing system.

The one or more computing systems or devices of the above-described systems (e.g., the distributed ledger interface server 270, the user device 202, the organization computing system(s) 220, and the data value source system(s) 240) may include, for example, desktops, servers, smart phones, tablets or laptop computers with wired or wireless transceivers, tablets or laptop computers communicatively coupled to other devices with wired or wireless transceivers, and/or any other type of device configured to perform the functions described herein and to communicate via a wired or wireless network. The computing systems or devices may include one or more of the components of computing device 101, illustrated in FIG. 1. For example, the computing systems or devices may include at least a processor and a communication interface (e.g., a network interface) to communicate with one another.

The user device 202 may comprise a mobile communication device, a mobile phone, a tablet computer, or a touch screen display device, etc., and may be associated with an individual who may be a member (e.g., an employee, an intern, an extern, a trainee, a fellow, a student, etc.) of an organization (e.g., an employer, an educational or vocational institution, etc.) or an individual who may be a candidate for a role or a position within an organization. User device 171, as shown in FIG. 1 may be an example of user device 202. As described in relation to computing device 101 of FIG. 1, an example user device 202 may include volatile, non-volatile, and/or hard disk memory (e.g., memory 115) for storing information. The memory may store applications, such as a background verification (BGV) application 206 for performing background verification using the distributed ledger interface system 270.

The BGV application 206 may be hosted, managed, and/or facilitated by the distributed ledger interface server 270 (e.g., via the background verification (BGV) application program interface (API) 281), as will be described herein. Furthermore, the BGV application 206 may be the same as, or at least share one or more functionalities with, BGV application 224 of the organization computing system(s) 220, or the BGV applications 246 and 258 of the data value source system(s) 240, and may also be hosted by the BGV API 281. The BGV application 206 may use or be implemented upon a user interface (UI) 204 of the user device 202. The UI 204 may facilitate the exchange of information with the distributed ledger interface server 270 and the organization computing system(s) 220 to allow the organization computing system(s) 220 to perform the background verification of the individual associated with the user device 202. The UI 204 may include a display (e.g., as in display 108 of computing device 101 in FIG. 1). For example, the display may be used to present information stored in the distributed ledger 290.

Also or alternatively, the user device 202 may comprise or show a replication of the distributed ledger 290 as distributed ledger 216. For example, the individual may be allowed to see certain aspects of the distributed ledger 290 (e.g., the individual-specific data structure 291 associated with the individual) and may be allowed to access a replication of the distributed ledger 290, distributed ledger 216, which has the individual-specific data structure. Furthermore, as a node participant of the distributed ledger, the individual may control the access to the distributed ledger for other devices and systems by using the digital key 208. As will be discussed further herein, the digital key may be generated by the distributed ledger interface server 270 (e.g., via digital key generator 280) and may be provided to the user device via the BGV application 206. The digital key may be any form of digital signature employing cryptography to provide validation and security. For example, the individual may be a candidate for a role or a position at an organization. The individual may use the digital key to grant permission to an organization computing system 220 of that organization, so that the organization has access to the individual-specific data structure of the individual in order to perform background verification of the individual. The digital key may be based on a use of a public key (e.g., allowing encryption of a message) and a private key (e.g., allowing a decryption of the message), or a combination thereof, as will be described herein. The public and private key may utilize robust cryptographic algorithms to assure the confidentiality and authenticity of electronic communications and data storage.

The individual may build a self-reported profile 210, which may comprise self-reported information pertinent to the candidacy for a role or position within an organization. The self-reported profile may comprise, or may be based on, one or more of a resume, curriculum vitae, self-reported grades or performance evaluations, a cover letter, a work sample, a recommendation, an online profile, etc. The self-reported profile may be stored in the memory of the user device 202.

The user device 202 may further comprise an input/output module 214 to allow the user to input information (e.g., via a keyboard, touchscreen, microphone, etc.), or receive output information (e.g., via external speakers or other peripherals). Input/output module 109 of computing device 101 in FIG. 1 may be an example of input/output module 214. Furthermore, a network interface 212 may facilitate communication with other computing devices and systems in environment 200 over communication network 268.

The organization computing system(s) 220 may include one or more computing systems, devices, or servers corresponding to one or more organizations (e.g., employers, educational institutions, etc.). For example, in the context of systems and methods described herein, one organization computing system may be associated with an organization in which the individual may be a member of, and another organization computing system may be associated with an organization for which the individual is seeking a role or position within. Thus, an organization computing system 220 may keep track of the members of the organization associated with the organization computing system 220, e.g., via a member profiles database 226. Furthermore, an organization computing system 220 may keep track of candidates applying for roles or positions within the organization, e.g., via a candidate profiles database 228.

The organization computing system device 141, as shown in FIG. 1 may be an example of an organization computing system 220. As described in relation to computing device 101 of FIG. 1, an example organization computing system 220 may include volatile, non-volatile, and/or hard disk memory (e.g., memory 115) for storing information. The memory may store applications, such as BGV application 224 for performing various methods described herein for performing background verification using the distributed ledger interface system 270. The BGV application 224 may be the same as, or at least share one or more functionalities with, BGV application 206 of the user device 220, and may also be hosted by the BGV API 281. The BGV application 224 may use or be implemented upon a user interface (UI) 222 to facilitate the exchange of information with the distributed ledger interface server 270, the user device 202, other organization computing systems, and data value source systems 240 to allow the organization computing system to perform the background verification of the individual associated with the user device 202. The UI 222 may include a display. For example, the display may be used to present information stored in the distributed ledger 290. Also or alternatively, the organization computing system 220 may comprise or show a replication of the distributed ledger 290 as distributed ledger 234, based on the organization being a participant node in one or more individual-specific data structures of the distributed ledger. In some aspects, the organization computing system 220 may be made a node participant of the individual-specific data structure, and thus be given access to a replica 234 of the distributed ledger 290, after receiving permission (e.g., a public digital key) from a preexisting node participant (e.g., the user device of the individual associated with the individual-specific data structure).

The organization computing system 220 may further comprise an input/output module 232 to allow the organization to input information (e.g., via a keyboard, touchscreen, microphone, etc.), or receive output information (e.g., via external speakers or other peripherals). Furthermore, a network interface 230 may facilitate communication with other computing devices and systems in environment 200 over communication network 268.

The data value source systems 240 may comprise computing systems, servers, and/or devices associated with organizations that provided or served as the original source for data values for background aspects of an individual in the individual-specific data structure. For example, a registrar computing system associated with a college can be the data value source system for a course grade recorded in the individual-specific data structure because the college registrar was the original source for generating the grade. Example data value source systems 240 may include the educational institution computing system 242 and the municipal office computing system 256. More or fewer data value source systems may be used without departing from the invention. Each of these data value source systems 240 may include a UI (e.g., UI 244 and 257), and applications (e.g., BGV apps 246 and 258), a network interface (e.g., network interfaces 248 and 260), and an input/output module (e.g., input/output modules 250 and 262), performing functions similar to the analogous or the similar components in the user device 202 and organization computing systems 220, as explained previously.

The data value source systems 240 may be contacted to perform a secondary verification of data values stored in the individual-specific data structure associated with the individual. A query engine (e.g., query engines 254 and 266) may assist in the secondary verification by searching for original records to verify a data value (e.g., a grade, a criminal conviction, etc.) recorded in the individual-specific data structure of the individual. The original records may include, for example, transcripts of the individual stored in a transcripts database 252 in the educational institution computing system 242, or criminal records stored in a criminal records database 264 in the municipal computing system 256.

The distributed ledger interface server 270 may comprise one or more computing systems or servers managing the interactions between the above-described systems (e.g., the distributed ledger interface server 270, the user device 202, the organization computing system(s) 220, and the data value source system(s) 240) and the distributed ledger 290 to perform one or more functions for background verification described herein. The distributed ledger interface server 270 may be an example of computing device 101 shown in FIG. 1. At a high level, the distributed ledger interface server 270 may comprise one or more databases (e.g., individuals database 271, nodes database 272, and/or organizations database 276, etc.), a linking engine 273, an update interface 274, a background verification (BGV) application program interface (API) 281 to host or manage background verification applications 206, 224, 246 and 258; a natural language processing (NLP) system 278, a geolocation and/or geocoding APIs ("geo API") 277, an encryption/decryption system 279, a digital key generator 280, and a network interface 275. The individuals database 271 may store identifiers and/or profiles for individuals using the distributed ledger interface server to facilitate background verification. The nodes database 272 may be used to identify node participants of a given individual-specific data structure within the distributed ledger 290. The list of node participants may expand, contract, or be otherwise updated, based on which devices may be granted permission to access and/or otherwise contribute to the information storage of an individual-specific data structure. The node participants may include one or more computing systems and devices of environment 200. The organizations database 276 may store a list of identifiers of organizations, e.g., by the identifiers of the corresponding organization computing systems 220.

The update interface 274 and linking engine 273 may form a database management application, software, or plug-in that may be used to perform create, read, update, or destroy (CRUD) functions with respect to data stored in the one or more databases. For example, the linking engine 273 may be used to form associations or link suitable data from different databases together, and/or to create new data based on associations or linkages. The update interface 274 may be used to update databases (e.g., by adding or deleting) data stored in the one or more databases based on instructions from other parts of the distributed ledger interface server 270 (e.g., computer readable instructions stored in memory of the BGV API 281) or information received from one or more other systems and devices of environment 200 (e.g., user device 202, organization computing systems 220, data value source systems 240, etc.). Furthermore, the update interface 274 may be used to enter information into the distributed ledger 290.

The distributed ledger 290 may be a database, repository, or ledger that may be updated by storing information using block chain technology and may comprise a plurality of individual-specific data structures 291 that may be replicated and available in a plurality of computing systems and devices (e.g., as in distributed ledger 216, distributed ledger 234, etc.). Each individual-specific data structure 291 may use a block chain approach (e.g., validation, cryptographic encryption, mining, etc.) to add individual-specific data pertaining to background aspects of an individual. For example, each individual-specific data structure may comprise one or more blocks (e.g., blocks 292A-292C), and may be created or extended by blocks linked to one another. If participant nodes of the individual-specific data structure request data values to be entered, the requested data values may be hashed, e.g., based on a cryptographic algorithm associated with the distributed ledger 290 and/or the individual-specific data structure 291. Before each data value can be entered, the data value may need to be verified from each of the participant nodes of the individual-specific data structure in which the data value is requested to be entered. After the verification, the data value may be entered into the individual-specific data structure as a block (e.g., block 292C comprising data value 294C) linked to a previously entered block (e.g., block 292B comprising data value 294B).

Furthermore, each individual-specific data structure may have predetermined participant computing devices or systems (e.g., "nodes," "node participants," "participant nodes," etc.) that may be able to access, validate, and/or view data entered in the individual-specific data structure. For example, an individual-specific data structure for an individual member of a first organization who desires to join a second organization may have, as its node participants, the user device associated with the individual, the organization computing system associated with the first organization, and the organization computing system associated with the second organization. Each node participant may be able to access, validate, and/or view data associated with the individual-specific data structure via a replicated distributed ledger on their respective device (e.g., as in distributed ledger 216, distributed ledger 234, etc.)

Information entered into the distributed ledger 290 may be encrypted by the encryptor/decryptor 279, and verified by one or more node participants of the distributed ledger prior to being recorded in the distributed ledger 290. The node participants for any individual-specific data structure within the distributed ledger 290 may be specified and/or determined from the nodes database 272. The distributed ledger 290 may include one or more individual-specific data structure(s) 291 for one or more individuals. An individual-specific data structure 291 may be used to store information related to an individual that is relevant to the individual's membership to an organization or candidacy for a position or a role in an organization. The information may be added into the individual-specific data structure as a data value 294A-294C in blocks 292A-292C. Prior to each data value being added into the distributed ledger, the data value may be verified and encrypted in accordance with methods presented herein. Each block, which stores a data value that has been entered, may be linked to a previously entered block of data value, so as to make the entered information immutable and indelible. Furthermore, since each data value may be verified by participant nodes of the individual-specific data structure 291, the information entered may be transparent and undisputed among the participant nodes of a given individual-specific data structure 291.

The BGV API 281 of the distributed ledger interface server 270 may manage, host, and/or facilitate the applications 206, 224, 246, and 258 running on user device 202, organization computing systems 220, educational computing system 242, and municipal computing system 256, respectively. The BGV API 281, through applications 206, 224, 246, and 258, may help to facilitate background verification for an individual via the distributed ledger interface system. For example, indications sent by the user device 202 to the organization computing system 220 to indicate that an individual is resigning from an organization, or permissions granted by the user device 202 to an organization computing system 220 to access an individual-specific data structure 292, may be sent via the BGV app 206, and managed by the BGV API 281. In such and like examples, the BGV API 281 may allow the distributed ledger interface server 270 to receive and/or relay the indications, permissions, and other messages between one device to another device in environment 200.

The BGV API 281, may utilize one or more of the databases of distributed ledger interface server 270, facilitate the exchange of information between the distributed ledger interface server 270 and one or more other computing systems and devices of environment 200, and may manage one or more functions of the systems and components of distributed ledger interface server 270. For example, the BGV API 281 may relay notifications of an individual ending membership to one organization; enabling the first organization to unlock access to the individual-specific data structure in the distributed ledger that is associated with the individual; generating and sending a digital key to the user device associated with the individual; allowing the individual to have another organization access the individual-specific data structure by way of the digital key; resetting and/or generating a new digital key; and facilitating secondary verification of data values for various background aspects associated with the individual by querying the data value source systems for information. Furthermore, the BGV API 281 may allow respective node participants of an individual-specific data structure of the distributed ledger to interact with the distributed ledger (e.g., by creating, validating, and/or accessing information recorded in the distributed ledger).

The geolocation and/or geocoding APIs ("geo API" 277) may be used to identify or estimate a real-world geographic location of a premise associated with an organization (e.g., an office, a factory, a farm, a warehouse, a school, etc.). The geo API 277 may be used with other applications (e.g., to initially identify a physical premise associated with an organization), or may be used in reverse (e.g., to determine the identity of a premise based on an inputted real-world geographic location).

The NLP system 278 may include various processors, libraries, and AI-based systems (e.g., machine learning (ML) tools 264) to analyze and convert natural language to one that could result in a computing system to perform substantive functions (e.g., to determine the job duty of an individual at an organization after parsing a resume). The NLP system 278 may be guided by a library and/or databases and AI-based tools for various uses in natural language processing, including the undergoing of supervised and unsupervised learning from language data. The NLP system 278 may support tasks, such as tokenization, sentence segmentation, part-of-speech tagging, named entity extraction, chunking, parsing, and coreference resolution. These tasks may be needed to build more advanced text processing services.

The encryptor/decryptor 279 may be a plug-in, application, API, or program tool for encrypting or decrypting data values, e.g., for being recorded in the distributed ledger 290. The digital key generator 280 may be a plug-in, application, API, or program tool for generating a digital key based on one or more cryptographic algorithms (e.g., symmetric key algorithms, public key algorithms, etc.). The digital key generator 280 may be used to generate a digital key to send to the user device. The individual may grant other devices and systems permission to access an individual-specific data structure associated with the individual by sending the digital key (e.g., a public digital key) to the intended recipient device or system (e.g., an organization computing system associated with an organization in which the individual likes to join).

Furthermore, network interface 275 may facilitate communication with other computing devices and systems in environment 200 over communication network 268.

Figure 3:
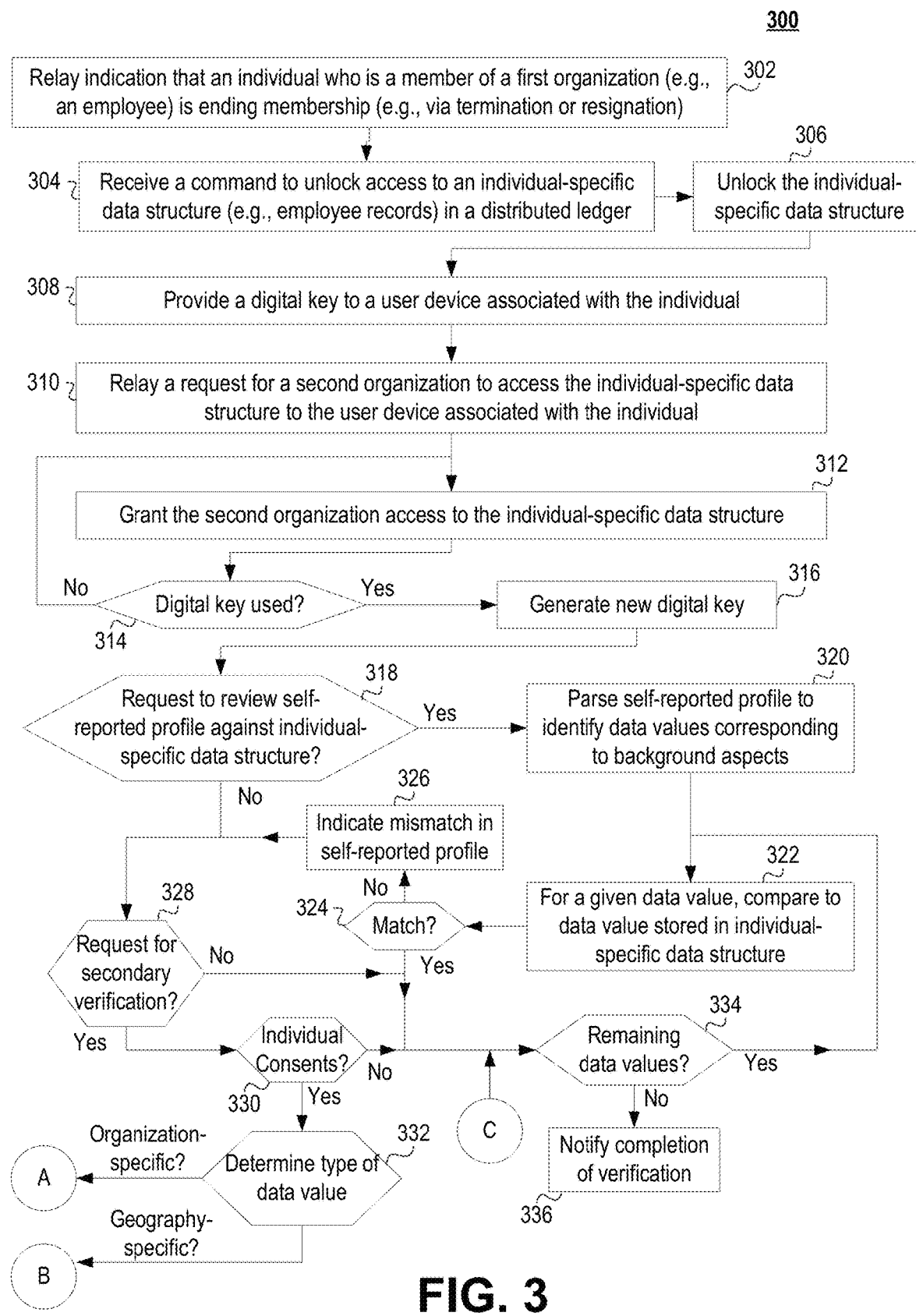
FIGS. 3-5 are flow diagrams for an example method that may be used to implement aspects of the disclosure.
Figure 4:
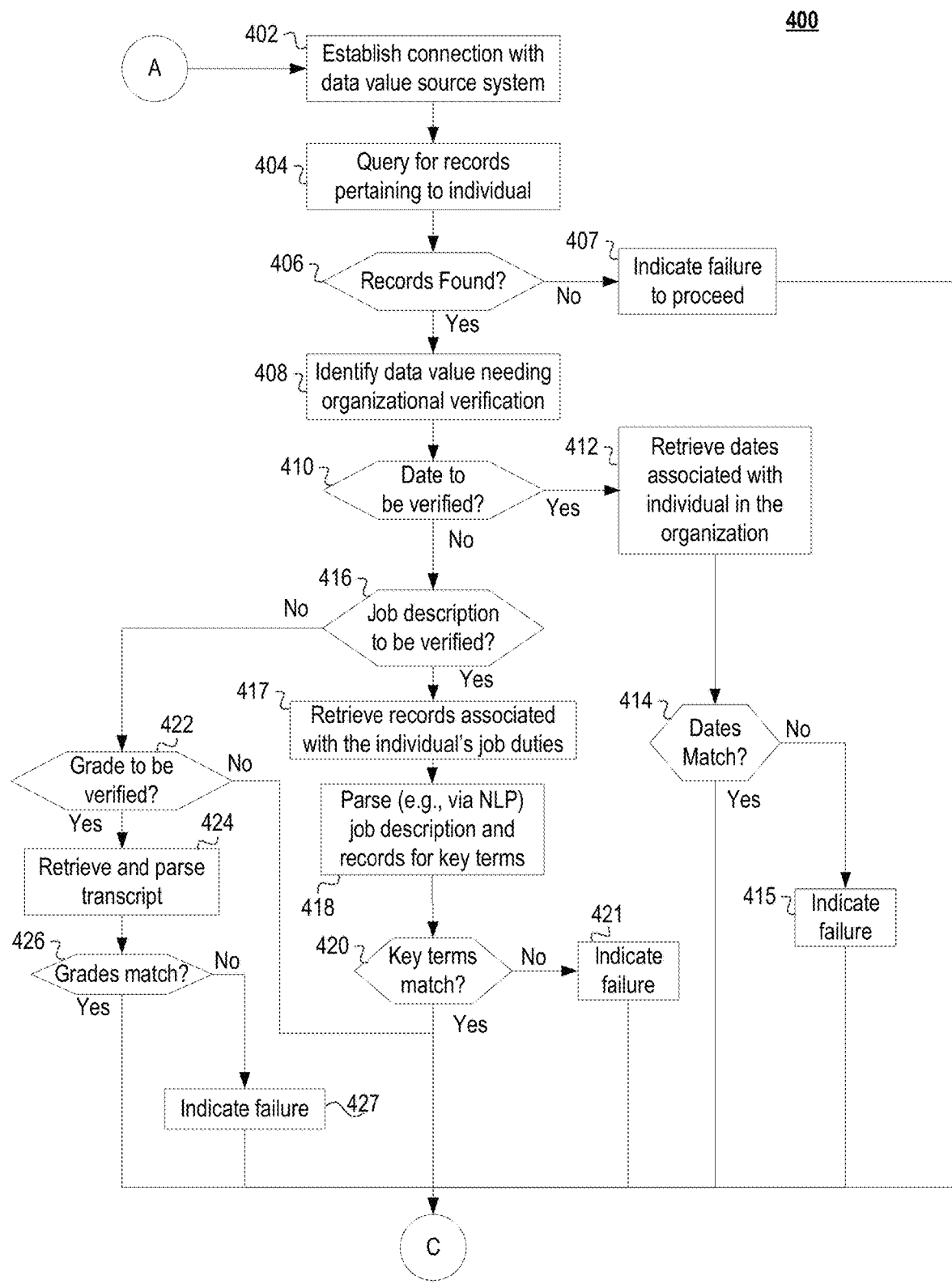
Figure 5:
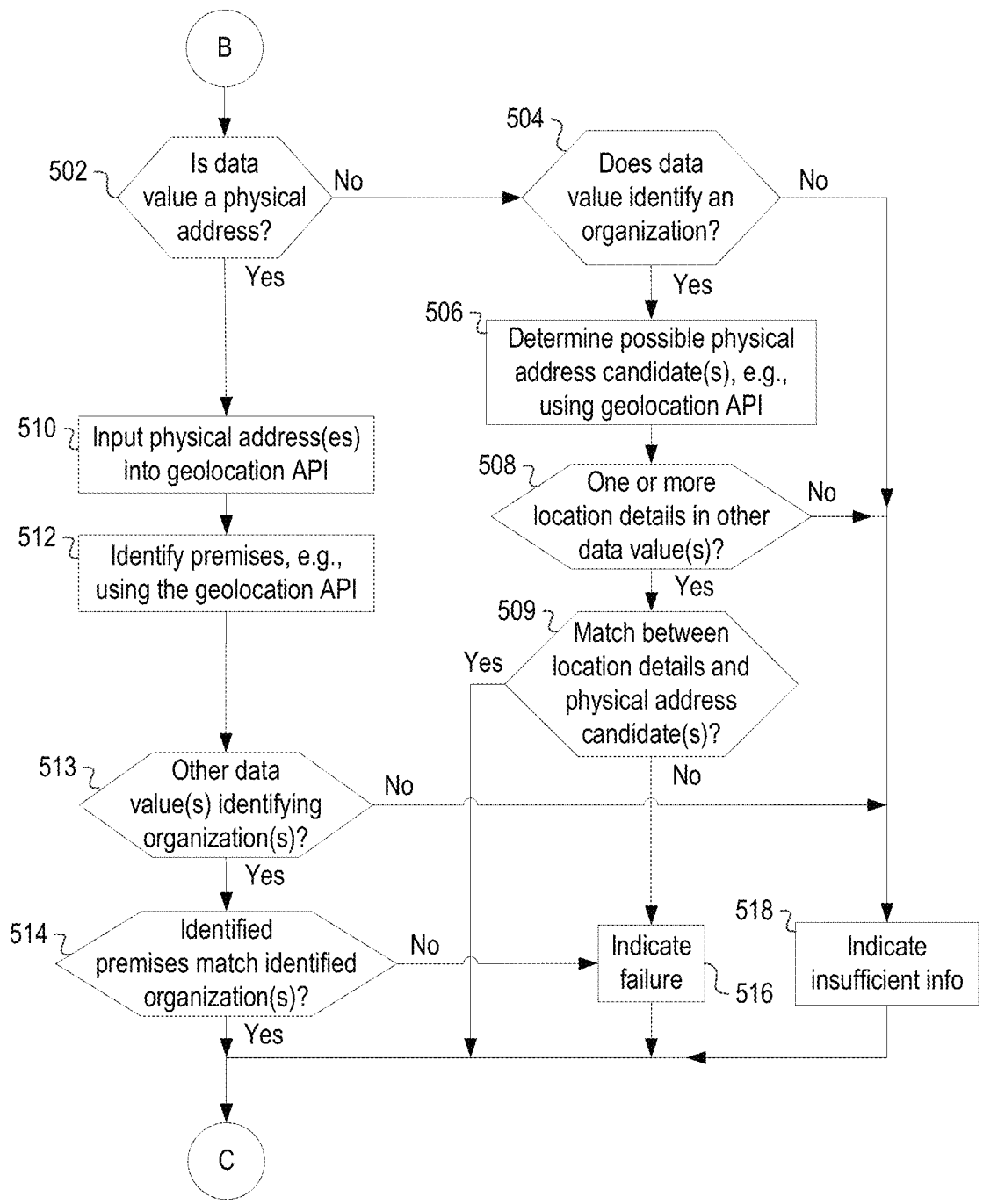

FIGS. 3-5 illustrate example flow diagrams that may be used to implement aspects of the disclosure. For examples, each of FIGS. 3-5 may refer to various stages of an example method for performing a background verification using a distributed ledger interface system. Method 300 may be performed by the distributed ledger interface server 270 shown in FIG. 2 and/or computing device 101 shown in FIG. 1. For simplicity, "distributed ledger interface server" may be used to refer to the performer of one or more steps of methods 300-500. Other devices and systems described in FIG. 2 may perform one or more steps as specified. Further, one or more steps described with respect to FIGS. 3-5 may be performed in an order other than the order shown and/or may be omitted without departing from the invention.

Referring now to FIG. 3, method 300 may begin when the distributed ledger interface server 270 receives an indication that an individual who is a member of an organization (e.g., an employee of the organization) is ending membership to the organization. For example, the member may be an employee whose employment may have been terminated, or the employee may be voluntarily resigning. The member may indicate the ending of the membership through sending a notification via the BGV app 206 on the user device 202. The indication may be relayed to the organization computing system associated with the organization from which the individual is ending membership (e.g., one of organization computing system(s) 220). For simplicity, this organization may be referred to as the "first organization," and the associated computing system may be referred to as "first organization computing system." The distributed ledger interface server 270, which may comprise the BGV API 281 hosting BGV app 206 may receive the indication, and may facilitate the sending of the indication to the first organization computing system. Thus, at step 302, the distributed ledger interface server 270 may relay, to the first organization computing system, the indication that the individual who is a member of the first organization is ending membership.

After receiving the indication, the first organization computing system may select to unlock access to the individual-specific data structure 291 associated with the individual in the distributed ledger 290. Access to the individual-specific data structure 291 may be previously locked during the course of the individual's employment at the first organization for security, since the individual-specific data structure may store sensitive and/or confidential information about the individual. In some implementations, the first organization computing system may be instructed or otherwise be in an obligation (e.g., as per employment agreement) to unlock access to the individual-specific data structure 291 in the distributed ledger, e.g., to allow for job mobility, since other potential employers may need to see the information stored in the individual-specific data structure before hiring the individual. The first organization computing system may select to unlock access on BGV app 224, hosted by BGV API 281 on the distributed ledger interface server 270. The selection may be registered as an executable command.

At step 304, the distributed ledger interface server 270 may receive the command to unlock access to the individual-specific data structure 291 in the distributed ledger. Based on the command, the distributed ledger interface server 270 may unlock the individual-specific data structure (e.g., as in step 306).

At step 308, the distributed ledger interface server 270 may send a digital key to the user device 202 associated with the individual. The digital key may be received via the BGV app 206 of the user device 202. The digital key may be any form of digital signature employing cryptography to provide a layer of validation and security for one or more requests, such as the request by the organization computing system of another organization to access the individual-specific data structure 291 associated with the individual. For simplicity, an organization for which the individual is a candidate may be referred to as the "second organization" and its organization computing system may be referred to as the "second organization computing system." In some aspects, the digital key may be available to the individual (e.g., stored on the user device) prior to the user device sending of the indication of ending membership. For example, the process of the second organization (e.g., an employer for which an organization has applied to for a role or a position) performing a background check for the individual may begin before the individual has given notice to the individual's current employer. Based on the results of the background check, the individual may appropriately decide whether or not to inform the individual's current employer of ending membership to the current employer. The digital key can be generated and sent to the user device before the individual has decided whether to end membership to the first organization.

Also or alternatively, a new digital key may be generated and sent to the user device after the sending of the indication of ending membership.

It is contemplated that the individual, e.g., in the hopes of securing new employment, may inform the second organization of background information recorded in the individual-specific data structure. Also or alternatively, the second organization may have been made aware of background information about the individual recorded in the individual-specific data structure. Thus, the second organization, via the second organization computing system, may request to access the individual-specific data structure, e.g., via BGV app 224 hosted by BGV API 281 of the distributed ledger interface server 270. At step 310, the distributed ledger interface server 270 may relay the request to access the individual-specific data structure to the user device associated with the individual.

The digital key may be used to grant the second organization computing system access to the individual-specific data structure (e.g., as in step 312). For example, a private key and public key may be generated by the digital key generator 280 of the distributed ledger interface server 270, and may be sent to the user device 202. In order to grant the second organization computing system the request to access the individual-specific data structure 291, the individual may electronically sign a permission to access the individual-specific data structure 291 using the private key, and may send the signed permission along with a public key to the second organization computing system. The second organization computing system may use the public key to validate the signed permission to access the individual-specific data structure. In some aspects, the exchange of the one or more digital keys between the distributed ledger interface server 270, the second organization computing system 220, and the user device 202, the request from the second organization computing system 220, and the granting of the request by the user device 202 may be performed via apps 224 and 246, hosted by BGV API 281 of the distributed ledger interface server 270.

In some aspects, the distributed ledger interface server 270 may monitor the digital key to determine whether it has been used, e.g., to access the individual-specific data structure (e.g., as in step 314). If used, the distributed ledger interface server 270 may generate and send a new digital key to the user device 202 at step 316. Generating a new digital key after use may further strengthen security and restrict access to the individual-specific data structure 291. If the digital key has not been used yet, the distributed ledger interface server 270 may wait for the second organization computing system 220 to access the individual-specific data structure using the digital key (e.g., public key provided by the user device).

After the second organization computing system has accessed the individual-specific data structure 292 associated with the individual, the distributed ledger interface server 270 may facilitate one or more functions for verifying various background information about the individual stored in the individual-specific data structure. For example, the individual may have presented a self-reported profile of the individual to the second organization, e.g., in the hopes of securing employment. The self-reported profile may be based on, or may comprise, one or more of a cover letter, a resume, a curriculum vitae, an online profile, a work sample, a recommendation, a referral, a self-reported grades or performance evaluation, etc. In at least one aspect, the second organization may want to compare the self-reported profile of the individual to the data values stored in the individual-specific data structure. For example, the second organization may want to determine whether an applicant's resume matches up to actual information about the applicant recorded by previous employers and educational institutions on the distributed ledger. The second organization may, via the BGV app 224 of the organization computing system 220, request to review the self-reported profile of the individual with the individual-specific data structure associated with the individual.

Thus, at step 318, the distributed ledger interface server 270 may determine whether it has received the request to review the individual's self-reported profile against individual-specific data structure. If there is such a request, the distributed ledger interface server 270 may parse the self-reported profile of the individual to identify data values corresponding to background aspects (e.g., as in step 320). For example, the NLP system 278 may process the natural language text of various documents (e.g., resume, cover letter, etc.) submitted by an employee seeking a position or role in the second organization. The NLP system 278 may use learned data and machine learning algorithms to recognize terms and phrases that correspond to data values for one or more background aspects (e.g., "3.7" for "GPA" or "Berkeley" for "Educational Institution"). Each identified data value for a corresponding background aspect may be compared to the data value recorded in the individual-specific data structure (e.g., as in step 322). For example, the data value "3.7" for a background aspect of "GPA" may be compared to a recorded value of "3.49" in the individual-specific data structure. The distributed ledger interface server 270 may determine whether there is a match in the data values (e.g., whether the data values satisfy a similarity threshold) at step 324. If there is no match (e.g., the data values fail to satisfy the similarity threshold), the distributed ledger interface server 270 may indicate this to the second organization computing system at step 326. For example, the second organization may receive a notification via BGV app 224 that the review of the self-reported profile of the individual failed at least on the background aspect corresponding to the data values that failed to match.

If the identified data value corresponding to the background aspect does match the data value recorded in the individual-specific data structure, however, the distributed ledger interface server may continue comparing other identified data values (e.g., see steps 334 and 332). If there are no more remaining data values identified from the parsing of the self-reported profile, the distributed ledger interface server 270 may notify the completion of the verification. e.g., on BGV app 246 of the second organization computing system 220 and/or BGV app 206 of the user device 202 at step 336.

It may be possible that the individual-specific data structure has the wrong data value recorded and/or the self-reported profile has the correct data value. Thus, in some aspects, the second organization may seek to double check whether information about the individual recorded in the individual-specific data structure of the distributed ledger is accurate (e.g., a "secondary verification"). The second organization may, via the BGV app 224 of the organization computing system 220, request the secondary verification. Thus, at step 328, the distributed ledger interface server 270 may determine whether it has received the request for the secondary verification, e.g., of a data value from the self-reported profile that has failed to satisfy the similarity threshold. If this request has been received, the individual may be contacted (e.g., via a notification sent to user device 202) for consent to having the distributed ledger interface server 270 perform the secondary verification. Also or alternatively, the individual may have previously agreed to allowing secondary verification, e.g., as part of the terms of using the distributed ledger interface server 270. At step 330, the distributed ledger interface server 270 may determine whether the individual consents to the secondary verification.

If the individual consents to the secondary verification (e.g., by sending an electronic indication to the distributed ledger interface server 270 via user device 202), the distributed ledger interface server 270 may determine a data value source system that may be appropriate for the secondary verification (e.g., as in step 332). As discussed previously, data value source systems 240 may comprise computing systems, devices, and servers that may be the original source of the specific data value being verified. Also or alternatively, the data value source systems 240 may be associated with organizations or institutions that may be the authority in determining the veracity of the data value being verified. For example, computing systems associated with the individual's alma mater may be a data value source system for determining the veracity of the individual's grades. In some aspects, determining the data value source systems may comprise determining, broadly, whether the data value comprises geographical information (e.g., identity and/or location of an employer, identity and/or location of an educational institution, etc.) or an organizational information (e.g., job descriptions, remarks, performance evaluations, etc.). If the data value source system concerns an organizational data value, the distributed ledger interface server 270 may proceed to performing one or more steps of method 400 described in FIG. 4. If the data value source system concerns an organizational data value, the distributed ledger interface server 270 may proceed to performing one or more steps of method 500 described in FIG. 5.

If the individual does not consent to having the secondary verification, the distributed ledger interface server 270 may continue to review remaining data values identified from the self-reported profile against the individual-specific data structure, e.g., by determining whether there are any remaining data values in the self-reported profile in step 334. If there are no more remaining data values identified from the parsing of the self-reported profile, the distributed ledger interface server 270 may notify the completion of the verification, e.g., on BGV app 224 of the second organization computing system 220 and/or BGV app 206 of the user device 202.

As discussed previously, the background information may be categorized and/or subcategorized into various background aspects. The background aspects may include, for example, aspects of previous employment, academic and/or training aspects, legal information (e.g., criminal and civil legal records), aspects about the individual's online profile, etc. As discussed previously, a data value may refer to individual-specific data describing the background aspects qualitatively and/or quantitatively. Furthermore, data values corresponding to a background aspect may be confidential or sensitive for the individual.

Referring now to FIG. 4, one or more steps of method 400 may be performed for secondary verification of a data value in the individual-specific data structure that comprises organizational information (e.g., job descriptions, remarks, performance evaluations, reasons for termination or hire, etc.). Thus, method 400 may be performed after the distributed ledger interface server 270 determines that the data value needing secondary verification is organization-specific (e.g., as in step 332).

At step 402, the distributed ledger interface may determine and establish connections with the data value source system 240. In some aspects, for example, where the data value source system is already a node participant in the individual-specific data structure of the distributed ledger, the data value source system 240 may already be communicatively linked to the distributed ledger interface server 270. As discussed previously, a data value source system 240 may function as a source for data values for various background aspects of the individual. A data value source system may comprise, for example, the educational institution computing system 242 or the municipal computing system 256, as they may be the original source of the organization-specific data value needing secondary verification (e.g., a GPA, a grade, a performance, a job description, a remark, a performance evaluation, a reason for termination or hire, etc.). In some aspects, each data value stored in the individual-specific data structure may include metadata identifying the source of the entry of the data value. The distributed ledger interface server 270 may use the metadata to identify and/or connect to the data value source system 240 that was the source of the data value. For example, a data value of "3.7" corresponding to the background aspect of "GPA" may include metadata identifying a computing system associated with an educational institution. If secondary verification for the GPA is requested, the distributed ledger interface server 270 may determine and establish connections with the computing system associated with the educational institution.

The distributed ledger interface server 270 may query the determined data value source system 240 for records pertaining to the individual (e.g., as in step 404). In some aspects metadata in the data value that identified the data value source system 240 may also include an identifier of the individual used by the data value source system 240. The identifier may be presented in the query.

The data value source system 240 may indicate, and the distributed ledger interface server 270 may receive the indication of, whether there are records pertaining to the individual in the data value source system (e.g., as in step 406). The records may comprise any archival data (e.g., saved transcripts, employment records, etc.) about the individual that may assist in determining the veracity and/or accuracy of the data value undergoing secondary verification. If there are no records, the secondary verification of the data value may fail to proceed based on the lack of records in the data value source system 240, and this failure may be indicated to the second organization computing system (e.g., as in step 407).

If records are found, the distributed ledger interface server 270 may indicate, to the data value source system 240, the data value needing secondary verification (e.g., as in step 408). For example, the data value needing secondary verification may include, but is not limited to, a date (e.g., as in step 410), a job description (e.g., as in step 416), or a grade (e.g., as in step 422). If a data value is a date to be verified, the distributed ledger interface server 270 may retrieve (e.g., after sending a request to the data value source system 240), dates associated with the individual (e.g., as in step 412). For example, the data value source system may be a computing system associated with a school that the individual had attended and may have, within its archives, dates of attendance by the individual. The distributed ledger interface server, at step 414 may compare the dates retrieved to the dates stored in the individual-specific data structure 291 to see if they match (e.g., satisfy a similarity threshold). If the dates do match, the secondary verification of the data value may be deemed successful by the distributed ledger interface server 270. If the dates do not match, the distributed ledger interface server 270 may indicate this (e.g., a failure to meet secondary verification), at step 415.

If the data value is a job description to be verified, the distributed ledger interface server 270 may retrieve (e.g., after sending a request to the data value source system 240), records associated with the job duties of the individual (e.g., as in step 417). For example, the data value source system may be a computing system associated with a previous employer of the individual and may have, within its archives, older resumes submitted by the individual or work product from the individual produced during the scope of employment.

At step 418, the distributed ledger interface server 270 may parse the job description stored as the data value in the individual-specific data structure and the records retrieved from the data value source system 240 for key terms associated with job roles and functions. For example, the NLP system 278 may process any natural language text of the job description and the records, and use learned data and machine learning algorithms to recognize terms and phrases that correspond to specific job roles (e.g., "finance," "legal," "manage," "patent," "drafting," etc.). The identified terms from the job description stored in the individual-specific data structure may be compared to the identified terms from the records to determine whether the two sets of identified terms match (e.g., satisfy a similarity threshold) (e.g., as in step 420). If there is a match, the secondary verification of the data value may be deemed successful by the distributed ledger interface server 270. If there is not a match, the distributed ledger interface server 270 may indicate this (e.g., a failure to meet secondary verification) at step 421.

If a data value is a grade to be verified, the distributed ledger interface server 270 may retrieve and parse (e.g., after sending a request to the data value source system 240), transcripts associated with the individual (e.g., as in step 424). For example, the data value source system may be a computing system associated with a school that the individual had attended and may have, within its archives, transcripts associated with the individual. The distributed ledger interface server, at step 426 may compare a grade in the retrieved transcript to the grade stored in the individual-specific data structure 291 to see if they match (e.g., satisfy a similarity threshold). If the grades do match, the secondary verification of the data value may be deemed successful by the distributed ledger interface server 270. If the dates do not match, the distributed ledger interface server 270 may indicate this (e.g., a failure to meet secondary verification), at step 427.

Referring now to FIG. 5, one or more steps of method 500 may be performed for secondary verification of a data value in the individual-specific data structure that comprises geographic information (e.g., identity and/or location of an employer, identity and/or location of an educational institution, etc.). Thus, method 500 may be performed after the distributed ledger interface server 270 determines that the data value needing secondary verification is geography-specific (e.g., as in step 332).

The distributed ledger interface server 270 may begin secondary verification of a geography-specific data value stored in the individual-specific data structure by determining whether the data value is a physical address (e.g., as in step 502). If so, the physical address may be inputted into the geocoding and/or geolocation APIs ("geo API" 277) at step 510. The geo API 277 may output what lies at the physical address, e.g., by providing a map with premises on the physical address, or identifying premises located on the physical address. The distributed ledger interface server 270 may thus use the geo API 277 to identify the premises at the physical address (e.g., as in step 512). The individual-specific structure may include other information about the individual that are associated with the physical address. For example, the individual-specific data structure may include data values identifying an organization that has physical locations, such as the name of a previous employer having an office at a physical address or the name of an educational institution previously attended having a physical address. These identifiers of organizations may be stored as other data values in addition to the data value of the physical address in the individual-specific data structure. Thus, the distributed ledger interface server 270 may determine whether there are other data values identifying organizations, which may be associated with the physical address in the individual-specific data structure (e.g., as in step 513). The distributed ledger interface server 270 may determine whether the identified organizations match (e.g., satisfy a similarity threshold) with the premises identified from the physical address. For example, the distributed ledger interface server 270 may compare names of multiple organizations to the identified premises to determine whether there is a match (e.g., as in step 514). In some aspects, the list of names of organizations may be narrowed down or filtered based on additional data values (e.g., dates) that make certain organizations more likely to be associated with the physical address than others. If at least one of the names of organizations matches the identified premises, the secondary verification of the data value may be deemed successful by the distributed ledger interface server 270. If there are no matches, the distributed ledger interface server 270 may indicate this (e.g., a failure to meet secondary verification), at step 516.

Also or alternatively, the identified data value needing secondary verification may comprise the name of an organization (e.g., as in step 504). If so, the distributed ledger interface server 270 may determine possible physical address candidate(s) for the identified organization, e.g., using the geo API (e.g., as in step 506). For example, the name of the organization may be inputted into the geo API 277. The geo API 277 may output what possible physical address of the named organization, e.g., by providing a map locating the one or more physical addresses associated with the organization, or identifying a physical address of the organization. The distributed ledger interface server 270 may thus use the geo API 277 to determine the physical address candidate(s) of the named organization. The individual-specific structure may include one or more details regarding the physical address or location of the organization (e.g., city and state of a previous employer or an educational institution attended by the individual) ("location details"). The location details may be stored as another data value in addition to the data value of the name of the organization in the individual-specific data structure. Thus, the distributed ledger interface server 270 may determine whether there are other data values identifying location details of the named organization, in step 508). At step 509, the distributed ledger interface server 270 may determine whether the location details stored as data values in the individual-specific data structure match (e.g., satisfy a similarity threshold) with the physical address of the named organization identified using the geo API 277. If there is a match, the secondary verification of the data value may be deemed successful by the distributed ledger interface server 270. If there is no match, the distributed ledger interface server 270 may indicate this (e.g., a failure to meet secondary verification), at step 516.

If the identified data value is not a physical address and does not identify an organization, the distributed ledger interface server 270 may indicate, e.g., to the second organization computing system, that there is insufficient information for the secondary verification (e.g., as in step 518). In some aspects, the user device 202 may be prompted to provide additional information, e.g., to be added to the candidate profile 228 of the second organization computing system.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   sending, via a communication network, by a distributed ledger interface system having at least one processor and to a first computing device associated with a first organization, an indication that an individual that has membership to the first organization is ending the membership to the first organization;
   unlocking, by the first computing device associated with the first organization and in response to a command received from the first computing device and the indication, access to an individual-specific data structure in a distributed ledger,
      wherein the individual-specific data structure allows storage of a plurality of data values corresponding to a plurality of background aspects of the individual;
      wherein the individual-specific data structure stores a first data value of the plurality of data values corresponding to a first background aspect of the plurality of background aspects of the individual, and
      wherein the distributed ledger is shared within a plurality of nodes within a network;
   providing, via the communication network by the distributed ledger interface system, to a user device associated with the individual and based on the unlocked access, a digital key associated with the individual-specific data structure to allow permission to access the individual-specific data structure;
   granting, by the distributed ledger interface system access to a second computing device associated with a second organization, and based on a permission received from the user device, access to the individual-specific data structures;
   receiving, by the distributed ledger interface system and from the second computing device, a request to perform a secondary verification of a given data value of the plurality of data values corresponding to the plurality of background aspects of the individual; and
   subsequent to performing the secondary verification and prior to granting the second computing device access:
      causing the second computing device to send, to the user device, a request to access the individual-specific data structure in the distributed ledger;
      causing the user device to share, to the second computing device, the digital key; and
      generating a new digital key associated with the individual-specific data structure to allow permission to access the individual-specific data structure.

2. The method of claim 1, further comprising, prior to the sending the indication,
   creating, by the distributed ledger interface system via the communication network, the individual-specific data structure in the distributed ledger, wherein the individual-specific data structure comprises one or more blocks;
   receiving, from a computing device associated with a node of the network, a request to enter the first data value corresponding to the first background aspect of the individual;
   hashing, based on a cryptographic algorithm associated with the distributed ledger, the first data value;
   receiving a verification from each of the nodes of the network for the first data value; and
   recording, in a first block of the one or more blocks of the individual-specific data structure in the distributed ledger, the first data value corresponding to the first background aspect.

3. The method of claim 1, further comprising:
   identifying a source computing system associated with a source of the given data value;
   establishing a connection with the source computing system; and
   requesting, based on a verification threshold, a verification of the given data value.

4. The method of claim 3, further comprising:
   receiving, from the source computing system, an indication that the given data value does not satisfy the verification threshold; and
   recording, in a second block of the one or more blocks of the individual-specific data structure in the distributed ledger, the indication that the given data value does not satisfy the verification threshold.

5. The method of claim 3, wherein the source computing system comprises a geocoding application program interface (API), and the given data value is a geographic information.

6. The method of claim 1, further comprising, prior to the sending the first indication,
   receiving, via the communication network, by the distributed ledger interface system and from the user device, the indication of ending membership to the first organization.

7. The method of claim 1, further comprising, prior to the unlocking the access to the individual-specific data structure,
   providing, by the computing system and to the first computing device, an option to unlock the access to the individual-specific data structure; and
   receiving, by the computing system and from the first computing device, a command to unlock the access to the individual-specific data structure.

8. The method of claim 1, wherein the plurality of nodes comprises at least the first computing device and the second computing device.

9. A system comprising:
   one or more processors; and
   a memory storing computer-executable instructions that, when executed by the one or more processors, cause the system to:
      communicate, via a communication network, to a first computing device of a first organization to cause the first computing device to unlock access to an individual-specific data structure in a distributed ledger in response to an indication that an individual that has membership to the first organization is ending the membership to the first organization,
         wherein the individual-specific data structure allows storage of a plurality of data values corresponding to a plurality of background aspects of the individual,
         wherein the individual-specific data structure stores a first data value of the plurality of data values corresponding to a first background aspect of the plurality of background aspects of the individual,
wherein the distributed ledger is shared within a plurality of nodes within a network, and
wherein the plurality of nodes includes at least the first computing device associated with the first organization;
provide, via the communication network to a user device associated with the individual and based on the unlocked access that is based on the indication, a digital key associated with the individual-specific data structure to allow the individual to control access to the individual-specific data structure;
grant, to a second computing device associated with a second organization, and based on permission received from the user device, access to the individual-specific data structure;
send, via the communication network, to the first computing device associated with the first organization, an indication that the individual is ending membership to the first organization;
receive, from the second computing device, a request to perform a secondary verification of a given data value of the plurality of data values corresponding to the plurality of background aspects of the individual; and
subsequent to performing the secondary verification and prior to granting the second computing device access:
cause the second computing device to send, to the user device, a request to access the individual-specific data structure in the distributed ledger;
cause the user device to share, to the second computing device, the digital key; and
generate a new digital key associated with the individual-specific data structure to allow permission to access the individual-specific data structure.

10. The system of claim 9, wherein the memory stores additional computer-executable instructions, which when executed by the one or more processors, cause the system to, prior to the unlocking the access to the individual-specific data structure,
receive, from the first computing device, a command to unlock the access to the individual-specific data structure.

11. The system of claim 10, wherein the memory stores additional computer-executable instructions, which when executed by the one or more processors, cause the system to:
create the individual-specific data structure in the distributed ledger, wherein the individual-specific data structure comprises one or more blocks;
receive, from a computing device associated with a node of the plurality of nodes of the network, a request to enter the first data value corresponding to the first background aspect of the individual;
hash, based on a cryptographic algorithm associated with the distributed ledger, the first data value;
receive a verification from each of the nodes of the network for the first data value; and
record, in a first block of the one or more blocks of the individual-specific data structure in the distributed ledger, the first data value corresponding to the first background aspect.

12. The system of claim 11, wherein the memory stores additional computer-executable instructions, which when executed by the one or more processors, cause the system to:
identify a source computing system associated with a source of the given data value;
establish a connection with the source computing system; and
request, based on a verification threshold, a verification of the given data value.

13. The system of claim 12, wherein the memory stores additional computer-executable instructions, which when executed by the one or more processors, cause the system to:
receive, from the source computing system, an indication that the given data value does not satisfy the verification threshold; and
record, in a second block of the one or more blocks of the individual-specific data structure in the distributed ledger, the indication that the given data value does not satisfy the verification threshold.

14. One or more non-transitory media storing instructions that, when executed by one or more processors, cause the one or more processors to perform steps comprising:
receiving, via a communication network and from a user device associated with an individual, an indication that the individual that has membership to the first organization is ending the membership to the first organization;
communicating, via a communication network, to a first computing device of a first organization to cause the first computing device to unlock access based on the indication to an individual-specific data structure in a distributed ledger,
wherein the individual-specific data structure allows storage of a plurality of data values corresponding to the plurality of background aspects of the individual;
wherein the individual-specific data structure stores a first data value of the plurality of data values corresponding to a first background aspect of the plurality of background aspects of the individual,
wherein the distributed ledger is shared within a plurality of nodes within a network,
and wherein the plurality of nodes includes at least the first computing device associated with the first organization;
providing, via the communication network to the user device and based on the unlocked access, a digital key associated with the individual-specific data structure to allow permission to access the individual-specific data structure;
granting, to a second computing device associated with a second organization, and based on a permission received from the user device, access to the individual-specific data structures;
receiving, from the second computing device, a request to perform a secondary verification of a given data value of the plurality of data values corresponding to the plurality of background aspects of the individual; and
subsequent to performing the secondary verification and prior to granting the second computing device access:
causing the second computing device to send, to the user device, a request to access the individual-specific data structure in the distributed ledger;
causing the user device to share, to the second computing device, the digital key; and
generating a new digital key associated with the individual-specific data structure to allow permission to access the individual-specific data structure.

15. The one or more non-transitory media of claim 14, storing instructions that, when executed by the one or more processors, cause the one or more processors to perform steps further comprising, prior to the sending the indication:

creating the individual-specific data structure in the distributed ledger, wherein the individual-specific data structure comprises one or more blocks;

receiving, from a computing device associated with a node of the network, a request to enter the first data value corresponding to the first background aspect of the individual;

hashing, based on a cryptographic algorithm associated with the distributed ledger, the first data value;

receiving a verification from each of the nodes of the network for the first data value; and recording, in a first block of the one or more blocks of the individual-specific data structure in the distributed ledger, the first data value corresponding to the first background aspect.

16. The one or more non-transitory media of claim 15, storing instructions that, when executed by the one or more processors, cause the one or more processors to perform steps further comprising:

identifying a source computing system associated with a source of the given data value;

establishing a connection with the source computing system; and requesting, based on a verification threshold, a verification of the given data value.

17. The one or more non-transitory media of claim 16, storing instructions that, when executed by the one or more processors, cause the one or more processors to perform steps further comprising:

receiving, from the source computing system, an indication that the given data value does not satisfy the verification threshold; and recording, in a second block of the one or more blocks of the individual-specific data structure in the distributed ledger, the indication that the given data value does not satisfy the verification threshold.

18. The one or more non-transitory media of claim 14, storing instructions that, when executed by the one or more processors, cause the one or more processors to perform steps further comprising:

after receiving the first indication, sending, via the communication network, to the first computing device, the indication of ending the membership to the first organization; and prior to unlocking the access to the individual-specific data structure, providing, to the first computing device, an option to unlock the access to the individual-specific data structure; and receiving, from the first computing device, the command to unlock the access to the individual-specific data structure.

\* \* \* \* \*